United States Patent
Mao et al.

(10) Patent No.: US 8,938,621 B2
(45) Date of Patent: Jan. 20, 2015

(54) COMPUTING DEVICE INTEGRITY PROTECTION

(75) Inventors: Yinian Mao, San Diego, CA (US); Anand Palanigounder, San Diego, CA (US); Qing Li, San Diego, CA (US); Edward George Tiedemann, Jr., Concord, MA (US); John Wallace Nasielski, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 219 days.

(21) Appl. No.: 13/274,968

(22) Filed: Nov. 18, 2011

(65) Prior Publication Data

US 2013/0132734 A1    May 23, 2013

(51) Int. Cl.
| | |
|---|---|
| G06F 11/30 | (2006.01) |
| G06F 12/14 | (2006.01) |
| G06F 21/73 | (2013.01) |
| G06F 21/70 | (2013.01) |
| G06F 15/16 | (2006.01) |
| G06F 17/30 | (2006.01) |

(52) U.S. Cl.
CPC ............... *G06F 21/73* (2013.01); *G06F 21/70* (2013.01)
USPC ............ 713/189; 726/2; 726/3; 726/5; 726/7; 709/248

(58) Field of Classification Search
USPC ......... 713/150–154, 160–174, 182–186, 189, 713/193, 202; 709/225, 229; 380/28–30, 380/44–47, 277–286, 255–283; 726/2–8
See application file for complete search history.

(56) References Cited

U.S. PATENT DOCUMENTS

| | | | |
|---|---|---|---|
| 7,000,115 B2 | 2/2006 | Lewis et al. | |
| 7,137,001 B2 | 11/2006 | Dabbish et al. | |
| 2002/0147918 A1* | 10/2002 | Osthoff et al. | 713/193 |
| 2008/0222428 A1* | 9/2008 | Dellow | 713/193 |
| 2010/0011207 A1* | 1/2010 | Fox et al. | 713/155 |
| 2011/0010543 A1 | 1/2011 | Schmidt et al. | |
| 2011/0093703 A1 | 4/2011 | Etchegoyen | |

OTHER PUBLICATIONS

Schutz, K.; "OEM Component Authentication", Design and Test of ICs for Secure Embedded Computing; IEEE Design & Test of Computers; p. 534; 0740-7475/07; Copublished by the IEEE CS and the IEEE CASS.
"Inside Windows Product Activation", Internet Citation, Nov. 16, 2004, XP002398929.
International Search Report and Written Opinion—PCT/US2012/065736—ISA/EPO—Mar. 6, 2013.
"Technical Details on Microsoft Product Activation for Windows XP", Internet Citation, Aug. 13, 2001, XP002398930.

* cited by examiner

*Primary Examiner* — Evans Desrosiers
(74) *Attorney, Agent, or Firm* — Won Tae Kim (57) ABSTRACT

A method of operating a computer system includes: obtaining, at the computer system, verification-input information associated with each of multiple hardware components of the computer system; cryptographically processing, at the computer system, the verification-input information to obtain a cryptographic result; and determining, at the computer system, whether to allow or inhibit, depending upon a comparison of the cryptographic result with a verification value, further operation of at least one of the hardware components.

27 Claims, 6 Drawing Sheets

COMPUTING DEVICE INTEGRITY PROTECTION

BACKGROUND

Computing devices are extremely popular, having become almost a necessity for many people. These devices are complex, provide many features and functions. System-on-Chip (SoC) designs are becoming more and more complex. One chipset can contain multiple microprocessors (or cores) and each core can have separate functionalities. In addition, the software that runs on each core can be written by different companies/entities. Also, the entity that is responsible for system integration may be different from the entities that provide software that runs on each of the cores. The operation of the system depends on the compatibility and interoperability of the software and the respective cores.

Operation of devices may suffer if chipset components are not used in the original combination of components. Components of a device, including chipsets, may be separated from each other and the components re-integrated with other, non-original components. The re-integrated device may be undesirable for several reasons, including that the operation may be diminished relative to the original chipset, e.g., due to use of lesser-quality components, software that is less compatible than software of the original components, software that is not authorized for or specifically designed for operation with the original components, etc.

SUMMARY

An example of a method of operating a computer system includes: obtaining, at the computer system, verification-input information associated with each of multiple hardware components of the computer system; cryptographically processing, at the computer system, the verification-input information to obtain a cryptographic result; and determining, at the computer system, whether to allow or inhibit, depending upon a comparison of the cryptographic result with a verification value, further operation of at least one of the hardware components.

Implementations of such a method may include one or more of the following features. The method further includes, at the computer system: accessing the verification value from storage on the computer system; and making the comparison of the cryptographic result with the verification value. The accessing includes accessing the verification value from one-time programmable memory of the computer system. The cryptographically processing includes generating the cryptographic result using the verification-input information and a secret key stored on the computer system. Making the comparison of the cryptographic result and the stored verification value at a mobile telecommunications device may be included. Storing the cryptographic result on the computer system in one-time programmable memory may be included. The storing includes programming a field-programmable read only memory a first time that the cryptographic result is determined. Computing the verification value by cryptographically applying a verification key stored on the computer system to a signed value stored on the computer system may be included. The cryptographically processing includes applying a one-way hash function to the verification-input information. The obtaining, processing, and determining are performed at least one of periodically or in response to a triggering event other than passage of time. Possibly included are: transmitting the cryptographic result from the computer system toward a remote apparatus; and receiving an indication of the comparison at the computer system from the remote apparatus; where the determining is based on the indication.

An example of a computing device includes: a set of first components; and a second component communicatively coupled to the first components, the second component configured to: obtain verification-input information associated with each of the first components; cryptographically process the verification-input information to obtain a cryptographic result; and determine whether to allow or inhibit, depending upon a comparison of the cryptographic result with a verification value, further operation of at least one of (1) the second component, or (2) at least one of the first components.

Implementations of such a computing device may include one or more of the following features. The second component is configured to: access the verification value from storage on the computing device; and make the comparison of the cryptographic result with the verification value. The second component includes one-time programmable memory and the second component is configured to access the verification value from the one-time programmable memory. To cryptographically process the verification-input information the second component is configured to generate the cryptographic result using the verification-input information and a secret key stored on the device. Each of the first components is configured to provide the associated verification-input information. The second component is configured to compute the verification value by cryptographically applying a verification key stored on the device to a signed value stored on the device. The second component is configured to apply a one-way hash function to the verification-input information to obtain the cryptographic result. The second component is configured to determine whether to allow or inhibit the further operation at least one of periodically or in response to a triggering event other than passage of time. The second component is configured to store the cryptographic result on the device in one-time programmable memory. The second component is configured to program a field-programmable read only memory a first time that the cryptographic result is determined in order to store the cryptographic result. A transceiver may be included that is communicatively coupled to the second component, where the second component is configured to: send the cryptographic result via the transceiver toward a remote system; and receive an indication from the remote system via the transceiver; where the second component is configured determine whether to allow or inhibit the further operation based on the indication.

Another example of a computing device includes: means for obtaining component information associated with each of a plurality of hardware components of the computing device; means for cryptographically processing the component information to obtain a cryptographic result; means for obtaining a verification value using non-volatile storage on the computing device; means for making a comparison of the cryptographic result with the verification value; and means for determining whether to allow or inhibit, depending upon the comparison of the cryptographic result with the verification value, operation of the computing device.

Implementations of such a computer device may include one or more of the following features. The means for cryptographically processing includes means for cryptographically combining the component information and a secret key stored on the computing device. One-time programmable memory means may be included for storing the verification value. The one-time programmable memory means includes a field-programmable read only memory. The means for obtaining is configured to obtain the component information at least one of periodically or in response to a triggering event other than passage of time. The means for cryptographically processing includes means for applying a one-way hash function to the component information. Means may be included for computing the verification value by cryptographically applying a verification key stored on the device to a signed value stored in the non-volatile storage. Transceiver means may be included, communicatively coupled to the means for cryptographically processing and the means for determining, for: sending the cryptographic result toward a remote system; and receiving an indication from the remote system; where the means for determining are configured to determine whether to allow or inhibit the further operation based on the indication.

An example of a computer-readable medium, of a computing device, includes computer-readable instructions configured to cause a computer to: obtain component information associated with each of a plurality of components of a computing device; cryptographically process the component information to obtain a cryptographic result; obtain a verification value using storage on the computing device; make a comparison of the cryptographic result with the verification value; and determine whether to allow or inhibit, depending upon the comparison of the cryptographic result with a verification value, further operation of the computing device.

Implementations of such a computer-readable medium may include one or more of the following features. The instructions configured to obtain the verification value are configured to cause the computer to access the verification value from one-time programmable memory of the computing device. The instructions configured to cause the computer to cryptographically process the component information are configured to cause the computer to cryptographically combine the component information and a secret key stored on the computing device. Instructions may be included that are configured to cause the computer to store the cryptographic result in one-time programmable memory of the computing device as the verification value the first time that the cryptographic result is obtained. The instructions configured to cause the computer to obtain the component information are configured to cause the computer to obtain the component information at least one of periodically or in response to a triggering event other than passage of time. The instructions configured to cause the computer to cryptographically process the component information are configured to cause the computer to apply a one-way hash function to the component information. The instructions configured to cause the computer to obtain the verification value are configured to cause the computer to cryptographically combine a signed value stored on the computing device and a verification key openly stored on the computing device to compute the verification value. Instructions may be included that are configured to cause the computer to transmit the cryptographic result from the computer system toward a remote apparatus, wherein the instructions configured to cause the computer to determine are configured to cause the computer to determine whether to allow or inhibit the further operation based on an indication received in response to transmission of the cryptographic result.

Items and/or techniques described herein may provide one or more of the following capabilities, as well as other capabilities not mentioned. The use of compatible components designed for use with each other may be better assured. Poor quality, and possibly illegally refurbished, chipsets can be reduced.

DETAILED DESCRIPTION

Techniques are provided to inhibit components of separate devices from being assembled into a new device and used, by creating a set of information that binds important device components cryptographically. One of the components (an "anchor" chipset) of a device is used to authenticate or confirm that a combination of components on a device is the original, and thus valid/acceptable, combination. The anchor chipset uses software that confirms that other hardware components, and preferably a combination of all other designated hardware components, belong with the anchor chipset. The anchor chipset can enumerate the other hardware components (e.g., a RAM memory chip, a Flash/eMMC non-volatile memory chip, a camera module, a display module, a GPS module, a WiFi module, a Bluetooth module, a power management module, an RF module, etc.). For example, the anchor chipset combines manufacturer, model, and/or unique identifier (e.g., serial number) information for the other components with the anchor chip's unique information (e.g., serial number). This combination uses a cryptographic digest algorithm to produce a set of information that is nearly impossible, and certainly impractical, to produce without the original combination of hardware components. This set of information is referred to as "Glue Bits" as they help ensure that the components are not separated. The Glue Bits are generated during an early stage of the device manufacturing lifecycle (e.g., during the initial device manufacturing, initial device operation), and stored in a write-once memory accessible to the anchor chip. The anchor chip will recalculate the Glue Bits intermittently (e.g., periodically, in response to a triggering event, etc.) and compare the recalculated Glue Bits with a stored glue bit set. If the recalculated and stored glue bit sets match, then the anchor chip allows operation of the components to continue. If the recalculated and stored bit sets do not match, then the anchor chip inhibits operation of the anchor chip, and possibly other components.

Figure 1:
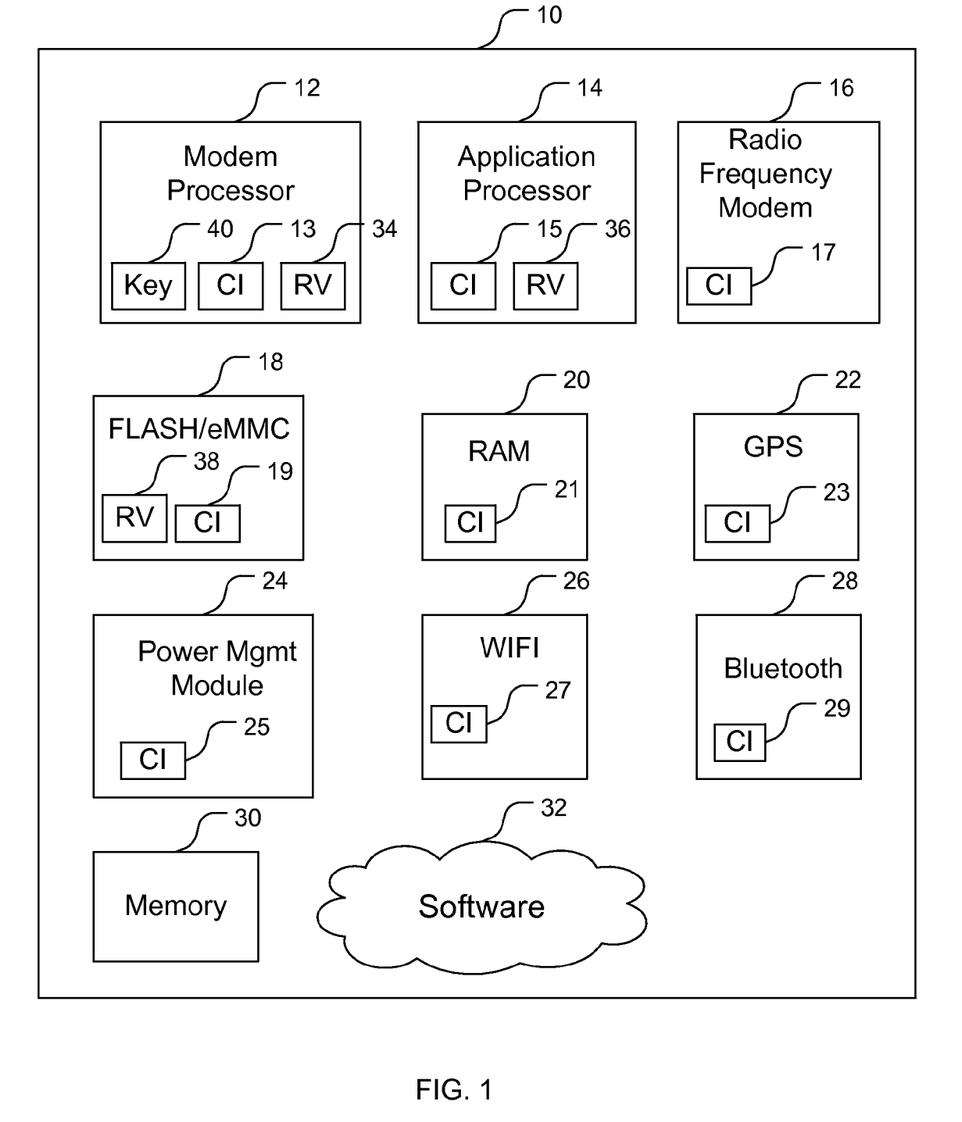
FIG. 1 is a simplified diagram of a computer device.

Referring to FIG. 1, a computing device 10 includes several components. Here, the computing device 10 is a mobile telecommunications device such as a mobile phone, and includes a modem processor 12, an application processor 14, a radio frequency (RF) modem 16, a FLASH/eMMC module 18, random access memory (RAM) 20, a global positioning satellite (GPS) system module 22, a power management module 24, a WiFi module 26, a BLUETOOTH® module 28, and memory 30. The FLASH/eMMC module 18 comprises non-volatile, flash memory and/or an embedded multimedia card (eMMC). The memory 30 comprises other memory of the device 10, e.g., read-only memory (ROM). The RF modem 16 is configured to communicate with other devices, e.g., cellular network base stations, using wireless electromagnetic signals. The GPS module 22 is configured to process GPS satellite signals to determine a location of the device 10. The WiFi and Bluetooth modules 26, 28 are configured to communicate with other devices, such as access points, using WiFi and Bluetooth protocols, respectively. While connections are not shown between the components of the device 10, the components 12, 14, 16, 18, 20, 22, 24, 26, 28 are communicatively connected to each other, e.g., through at least one of the processors 12, 14 and/or directly. Further, the modem processor 12 and possibly the application processor 14 are part of a hardware processor. Also, each of the components 12, 14, 16, 18, 20, 22, 24, 26, 28 contains respective component information (CI) 13, 15, 17, 19, 21, 23, 25, 27, 29 for use in generating a cryptographic value to verify device integrity. In this example, the processor 12 also stores a secret key 40, e.g., stored in hardware, for use in generating the cryptographic value. The secret key 40 is stored such that the secret key 40 is inaccessible to unauthorized components (e.g., impractical, if not impossible, to access, at least without ruining the processor 12).

Within an intelligent component of the device 10 resides device integrity information. This information can be referred to as a verification value or reference value (RV) that is a stored authentic value of the Glue Bits. The term Glue Bits is used, regardless of the actual form of the information, to indicate that the device integrity information is useful in helping to ensure that original components, e.g., select ones of the components 12, 14, 16, 18, 20, 22, 24, 26, 28, 30, remain together, e.g., for operation of the intelligent component to be enabled. In the device 10, the modem processor 12 includes an RV 34, although the application processor 14 could include an RV 36 or the FLASH/eMMC could include an RV 38. Typically, the RV 34 and the RV 36 will be different. For example, the same components, but different keys, could be used to generate the RV 34 or the RV 36, and thus the RV 34 would be different from the RV 36, although this is not required. For the sake of simplicity of the discussion below, only the modem processor 12 is discussed regarding generation and use of the device integrity information, but the discussion applies to any component similarly configured, such as the application processor 14. The device integrity information is configured to bind cryptographically the components associated with, and used to produce, the device integrity information as further discussed below.

The device 10 includes software resident in processor-readable, computer-readable, memory. The software includes processor-readable program code, i.e., instructions, that are configured to cause a processor to perform functions described above and below. In particular, the device 10 includes software 32 which may be stored in the memory 30 but is shown separately for illustrative purposes. The software 32 drives the hardware processor, and may include basic operating system (OS) functions and/or modem drivers, and may interact with the RF modem 16. Within the software 32 in non-volatile memory, there is software configured to implement device integrity. This software is referred to herein as device integrity software or glue code.

The modem processor 12 is configured to authenticate its modem code. Modem processor hardware authenticates modem code via a secure boot operation that ensures the integrity of the modem code. The modem code includes code to cause the modem processor 12 to generate and use the device integrity information as appropriate. The modem code is configured to cause the processor 12 to generate the device integrity information the first time that the device is introduced to a network for use (e.g., the first time in operation after manufacture), and to verify the device integrity information thereafter. The processor 12 will generate the RV 34 during the first power-up of the processor 12 and actuate a once-modifiable indicator, e.g., by toggling a write-once bit. The processor 12 will store the RV 34 in non-volatile memory for future use in device integrity verification (i.e., ensuring that device composition of relevant components matches original relevant component composition).

Figure 2A:
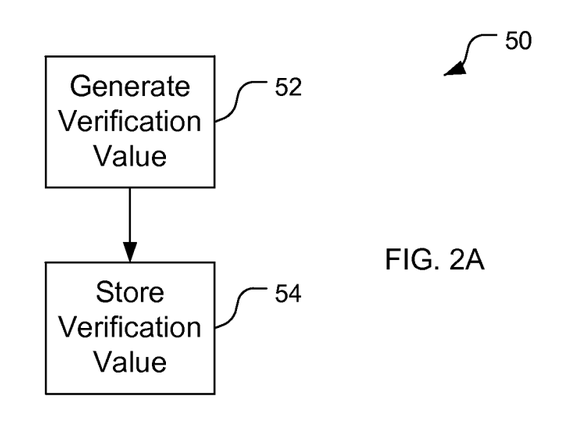
FIG. 2A is a block flow diagram of a process of establishing and storing a verification value for device integrity verification.

Referring to FIG. 2A, with further reference to FIG. 1, a process 50 of establishing and storing a verification value for device integrity verification includes the stages shown. The process 50 is, however, an example only and not limiting/exhaustive.

At stage 52, a verification value (here the RV 34) is generated using verification-input information, e.g., component serial numbers and/or other identifiers. The verification value is preferably generated once, e.g., during the first power up of the device for operation. The verification value can be generated in a variety of ways, e.g., applying a hash function to the verification-input information in the anchor chip, applying a hash function and a secret key to the verification-input information in the anchor chip (e.g., with the secret key stored on-chip), encrypting the verification-input information using a signing key during manufacture and having a verification key accessible to the anchor chip, e.g., exposed in software of the device.

At stage 54, the verification value is stored in non-volatile memory. The stored verification value can be stored in a variety of locations, but in a way that they are protected from being overwritten. The stored Glue Bits can be in non-volatile one-time programmable memory inside the anchor chip (e.g., the Glue Bits 34 in a PROM, EPROM, or one-time programmable memory such as field-programmable read only memory) or outside the anchor chip (e.g., the Glue Bits 36 in the application processor 14 or the Glue Bits 38 in the FLASH or eMMC 18). Further, the stored Glue Bits could be stored remotely from the device 10 and compared with the recalculated bits at the remote location.

Figure 2B:
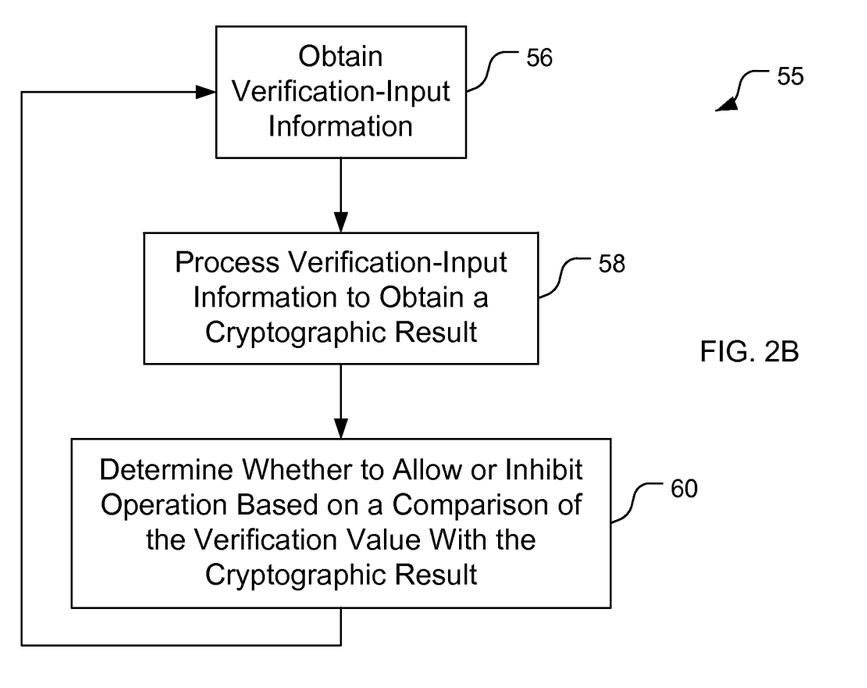
FIG. 2B is a block flow diagram of a process of verifying device integrity.

Referring to FIG. 2B, with further reference to FIGS. 1 and 2A, a process 55 of verifying device integrity includes the stages shown. The process 55 is, however, an example only and not limiting/exhaustive.

At stage 56, verification-input information is obtained (e.g., by obtaining the CI from hardware components in the device 10). The verification-input information is associated with each hardware component making up a combination whose integrity it is desired to help ensure.

At stage 58, the verification-input information is cryptographically processed using the authenticated software code to obtain a cryptographic result, the Glue Bits. At stage 60, it is determined whether to allow or inhibit, depending upon a comparison of the cryptographic result with a stored verification value, further operation of at least one of the hardware components. Stages 52 and 54 are preferably performed once, and stages 56, 58, and 60 are repeatedly performed, e.g., periodically, in response to a trigger (e.g., at each start-up or electrical charging of the device 10), etc.

Figure 3:
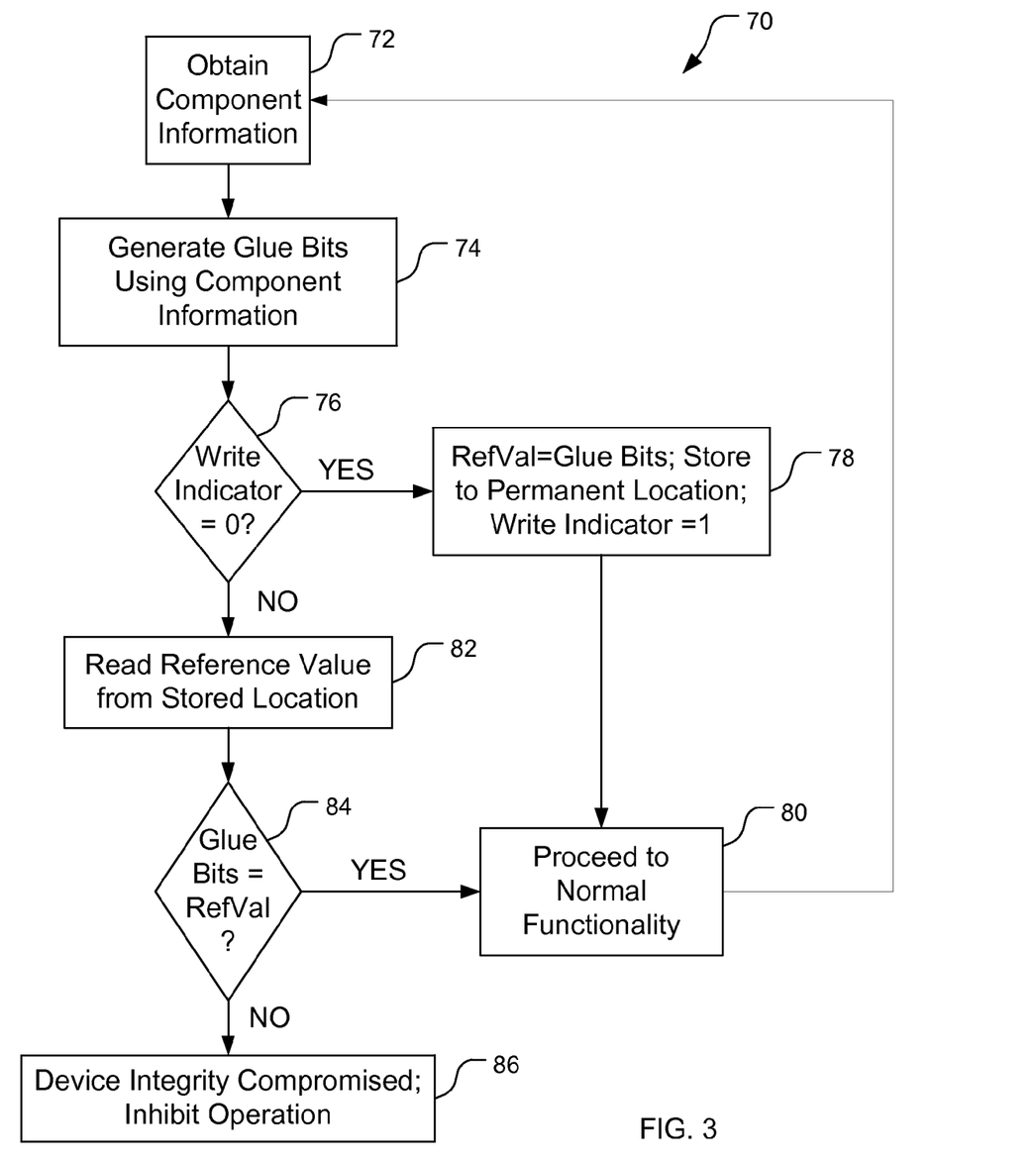
FIG. 3 is a block flow diagram of an example of the process shown in FIG. 2.

Referring to FIG. 3, a particular implementation of the process 50, here a process 70 of verifying device integrity, includes the stages shown. The process 70 is, however, an example only and not limiting/exhaustive.

At stage 72, the anchor chip, here the modem processor 12, prepares to generate a cryptographic value. The processor 12 acquires or obtains (e.g., reads) the component information 13, 15, 17, 19, 21, 23, 25, 27, 29 from the components of the device 10 that are desired to be included in the device integrity verification. The component information 13, 15, 17, 19, 21, 23, 25, 27, 29 is associated with each of the various components of the device 10 that are to be included in device integrity. For example, the component information 13, 15, 17, 19, 21, 23, 25, 27, 29 can be serial numbers and/or make/model information of the components 12, 14, 16, 18, 20, 22, 24, 26, 28. The processor 12 obtains the component information 13, 15, 17, 19, 21, 23, 25, 27, 29 in response to a triggering event such as an electrical charging event or power up of the device 10, expiration of a timer, receipt of a triggering message (e.g., from a network server (not shown)), etc.

At stage 74, the processor 12 generates the cryptographic value or Glue Bits. The processor 12 uses the secret key 40 and the component information 13, 15, 17, 19, 21, 23, 25, 27, 29 to cryptographically form the cryptographic value. Here, the processor 12 uses the secret key 40 and the component information 13, 15, 17, 19, 21, 23, 25, 27, 29 as inputs to a one-way hash function, e.g., SHA256, to generate the cryptographic value. In particular, the processor 12 obtains component information 13, 15, 17, 19, 21, 23, 25, 27, 29 of the modem processor 12, the application processor 14, the RF modem 16, the FLASH/eMMC module 18, the RAM module 20, the GPS module 22, the power management module 24, the WIFI module 26, and the Bluetooth module 28. Here, the processor 12 calculates the Glue Bits using a hashed message authentication code (HMAC) according to:

$$\text{Glue Bits} = \text{HMAC}_{HW\text{-}Key}(\text{MEID}\|\text{modem ver}\|\text{CompInfo}_1\|\text{CompInfo}_2\|\ldots\|\text{CompInfo}_n) \quad (1)$$

where $\text{Compinfo}_m$ is the component information of module m, modem ver is the version of the modem processor 12, and MEID is the mobile equipment identifier or any identifier associated with the device (if available). This is an example, and not the only technique or equation that can be used for determining the Glue Bits. For example, MEID and/or modem ver can be omitted or a hash function (e.g., SHA1) could be used without a key according to:

$$\text{Glue Bits} = \text{SHA1}(\text{MEID}\|\text{modem ver}\|\text{CompInfo}_1\|\text{CompInfo}_2\|\ldots\|\text{CompInfo}_n) \quad (2)$$

At stage 76, the processor 12 analyzes the value of a write-once indicator. Here, the write-once indicator is a write-once bit and the processor 12 determines whether a write-once bit indicates a zero or a one. Alternatively, a multi-bit value can be used to provide redundancy and high reliability for the write-once indicator. If the write-once indicator indicates that a verification value RefVal has already been stored (here, the write-once bit has a value of one), then the process 70 proceeds to stage 82. If the write-once indicator indicates that the verification value has yet to be stored (here, the write-once bit has a value of zero), then the process 70 proceeds to stage 78 where the processor 12 stores the Glue Bits (i.e., the cryptographic value) as the verification value in non-volatile, one-time programmable memory. The first-time reported Glue Bits are considered to be authentic, and thus stored for future reference. The processor 12 changes the write-once bit to indicate a one, by programming a field-programmable read only memory or other one-time programmable memory device implementing the write-once bit. The process 70 then proceeds to stage 80 where operation of the device 10 proceeds, preferably with all functionalities of the components of the device 10 enabled. The process 70 returns to stage 72.

At stage 82, with the verification value having already been stored, the verification value is read from memory. The processor 12 reads the verification value RefVal from its stored location in non-volatile memory for use in comparing with the cryptographic result determined at stage 74.

At stage 84, a comparison is made with the Glue Bits and the verification value. The processor 12 compares the Glue Bits with the verification value and determines whether they are the same. If they are identical, then the process 70 proceeds to stage 80, and if the Glue Bits and the verification value are not identical, then the process 70 proceeds to stage 86.

At stage 86, operation of the device 10 is inhibited. The processor 12, having determined that the integrity of the device 10 has been compromised, inhibits operation of the device 10. For example, the processor 12 can inhibit further operation of the processor 12 with any of the components whose information was used in forming the Glue Bits. Alternatively, the processor 12 could terminate cooperation with any other component of the device 10 whether that component's information was used to form the Glue Bits or not.

Other Examples

Figure 4:
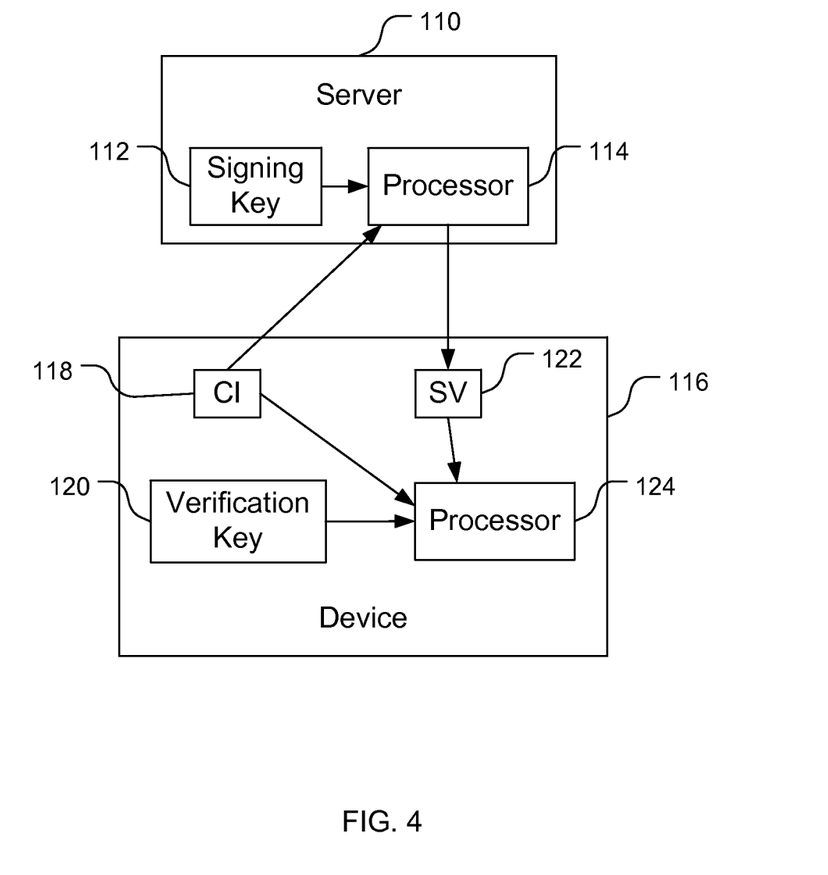
FIG. 4 is a simplified diagram of a telecommunication system.

Other configurations and methods than those discussed above may be used. For example, while the discussion above focused on generation of the RV on the device 10 and storage of the RV 34 on the device 10, a value for use in verifying integrity of a device could be generated remotely from the device whose integrity is to be verified. Referring to FIG. 4, a server 110 stores a signing key 112 in memory, includes a processor 114, and can communicate with a device 116 whose integrity is to be verified. The device 116 contains component information (CI) 118, and stores a verification key 120, and a signed value (SV) 122 in memory, and contains a processor 124. The processors 114, 124 are configured (e.g., by appropriate stored software code instructions) to perform operations discussed with respect to FIG. 5.

Figure 5:
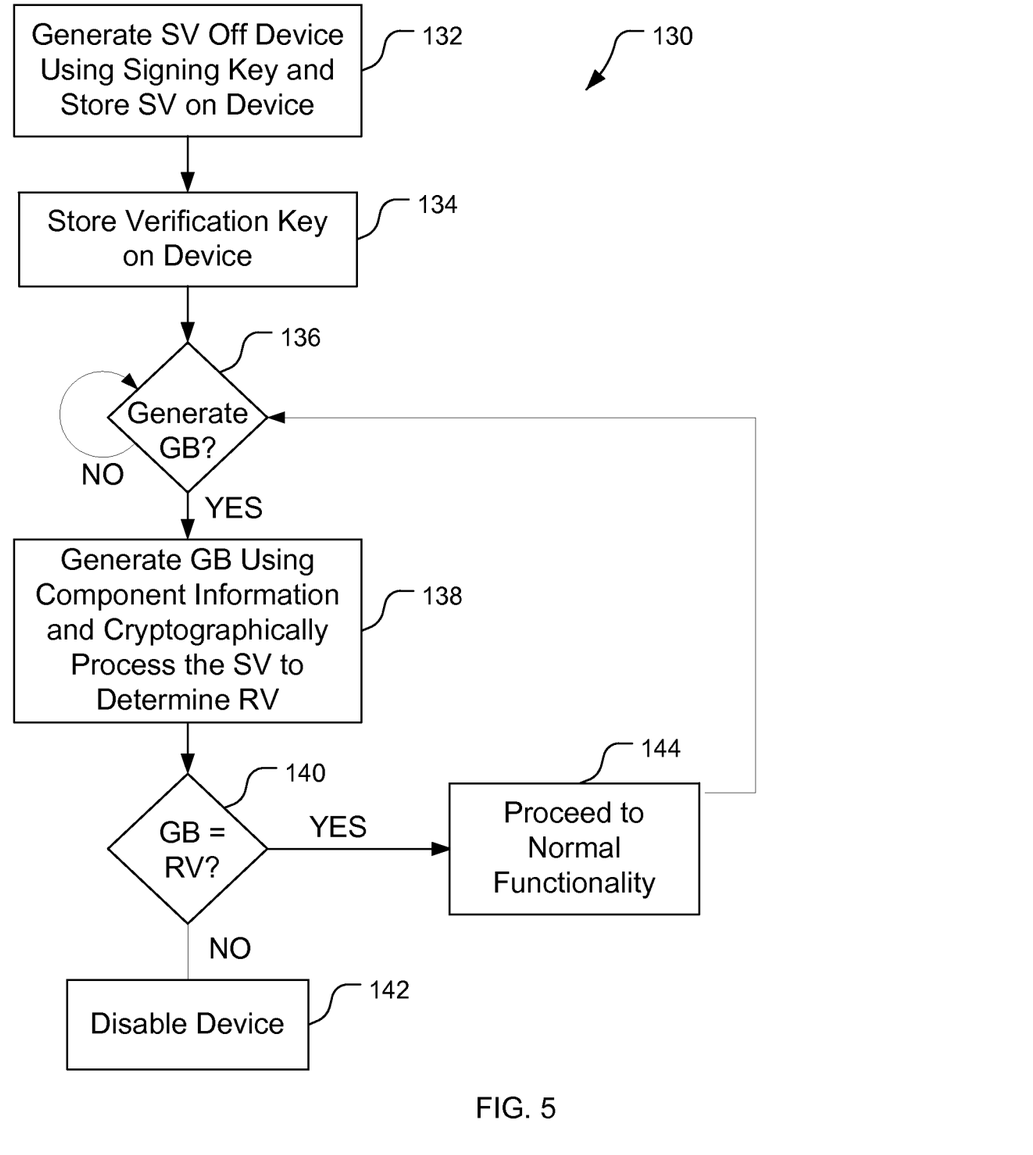
FIG. 5 is a block flow diagram of a process of verifying integrity of a device shown in FIG. 4.

Referring also to FIG. 5, a process 130 of verifying device integrity includes the stages shown. The process 130 is, however, an example only and not limiting. The process 130 can be altered, e.g., by having stages added, removed, rearranged, combined, and/or performed concurrently.

At stage 132, the SV 118 is generated off device and stored on the device 116. The server processor 114 obtains the CI 118 from the device 116 and uses the signing key 112 to cryptographically process the CI 118 to generate the SV 122. The server processor 114 transmits the SV 122 to the device 116 where the SV 122 is then stored. This stage can be performed, for example, during manufacture of the device 116 with the server 110 being a server of the manufacturer, with the signing key being kept separate from the device 116, and with the manufacturer provisioning the SV 122.

At stage 134, the verification key 120 corresponding to the signing key 112 is stored on the device 116. This stage can also be performed during manufacture of the device 116, with the manufacturer provisioning the verification key 120. Alternatively, this stage could be performed after manufacture of the device 116, e.g., with the device 116 downloading the verification key 120 through a network. The verification key 120 may be stored openly in the device 116, i.e., not inaccessibly hidden in hardware, but is stored in a way that it cannot be altered once programmed (e.g., stored in one-time programmable memory).

At stage 136, it is determined whether to generate Glue Bits. The device 116 waits for a triggering event such as power up or electrical charging of the device 116, expiration of a timer, receipt of a triggering message (e.g., from a network server (not shown)), etc. In the absence of a trigger, the process 130 remains at stage 136. In response to a trigger, the process 130 proceeds to stage 138.

At stage 138, the device 116 generates Glue Bits using the CI 118 and cryptographically processes the SV 122. The device processor 124 obtains the CI 118 and applies a hash function to the CI 118 to determine the Glue Bits. The device processor 124 also obtains the verification key 120 and cryptographically processes the SV 122 using the verification key 120 to determine a reference value (RV).

At stage 140, an inquiry is made as to whether the Glue Bits match the RV. The device processor 124 compares the Glue Bits determined from the CI 118 with the RV derived from the SV 122 and the verification key 120. If the Glue Bits do not match the computed RV, then the process 130 proceeds to stage 142 where the device 116 is at least partially disabled. If the Glue Bits match the computed RV, then the process 130 proceeds to stage 144 where operation of the device 116 proceeds, preferably with all functionalities of the components of the device 116 enabled.

Figure 6:
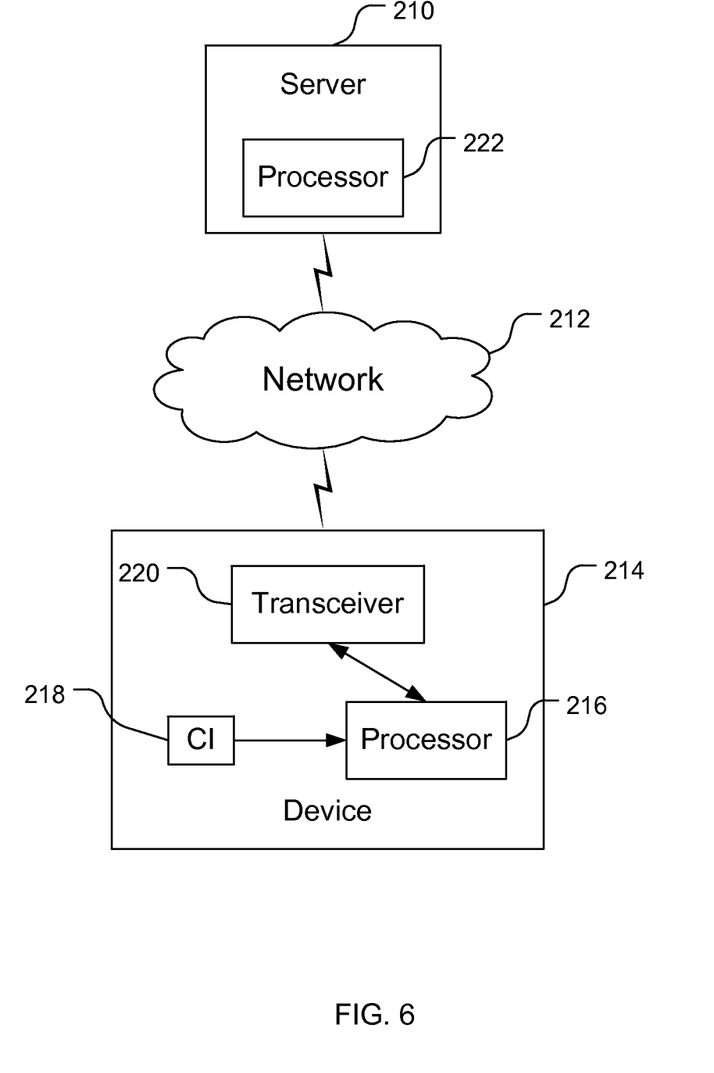
FIG. 6 is a block diagram of a system for remotely verifying device integrity.

Still further, referring to FIG. 6, a determination of integrity can be made remotely. A system 200 includes server 210, a network 212, and a computer device 214 such as a mobile telecommunications device. The server 210 is configured to communicate with the device 214 through the network 212 and vice versa. The device 214 includes a device processor 216 that is configured to collect component information (CI) 218 and cryptographically process the CI 218 (e.g., in accordance with techniques discussed above (e.g., by applying a hash function, applying a key, etc.)). The device processor 216 is further configured to transmit the cryptographically processed CI via a transceiver 220 to the server 210 via the network 212. The server 210 includes a server processor 222 that is configured to compare the received information from the device 214 with reference information obtained by the server processor 222 (e.g., accessed from memory or determined from stored information). The server processor 222 is configured to send an indication of whether the integrity of the device 214 is intact, e.g., whether the information received from the device 214 matches the reference information, to the device 214 via the network 212. The device processor 216 is configured to receive the indication via the transceiver 220 and determine whether to inhibit or allow operation of the device 214 based on the indication. Alternatively, the device processor 216 could send the CI 218 to the server 210 without encrypting the CI 218.

Other Considerations

Still further implementations and configurations are possible.

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims. Further, more than one invention may be disclosed.

What is claimed is:

1. A method of operating a computer system, the method comprising:
   obtaining, at the computer system, verification-input information associated with each of a plurality of hardware components of the computer system, the verification-input information comprising an identifier of each of the plurality of hardware components of the computer system, the verification-input information comprising at least one of a manufacturer or a model number for at least one of the plurality of hardware components;
   cryptographically processing, at the computer system, the verification-input information by applying a one-way hash function to the verification-input information to obtain a cryptographic result representing a current hardware configuration of the computer system;
   computing a verification value by cryptographically applying a verification key stored on the computer system to a signed value stored on the computer system; and
   determining, at the computer system, whether to allow or inhibit, depending upon a comparison of the cryptographic result with the verification value, further operation of at least one of the plurality of hardware components, the verification value comprising device integrity information comprising an identifier of each of a plurality of components of a predetermined hardware configuration of the computer system.
   wherein the obtaining, processing, and determining are performed at least one of periodically or in response to a triggering event.

2. The method of claim 1 further comprising, at the computer system:
   accessing the verification value from storage on the computer system; and
   making the comparison of the cryptographic result with the verification value.

3. The method of claim 2 wherein the accessing comprises accessing the verification value from one-time programmable memory of the computer system.

4. The method of claim 1 wherein the cryptographically processing includes generating the cryptographic result using the verification-input information and a secret key stored on the computer system.

5. The method of claim 4 further comprising making the comparison of the cryptographic result and the verification value at a mobile telecommunications device.

6. The method of claim 1 further comprising storing the cryptographic result on the computer system in one-time programmable memory.

7. The method of claim 6 wherein the storing comprises programming a field-programmable read only memory a first time that the cryptographic result is determined.

8. The method of claim 1 further comprising:
   transmitting the cryptographic result from the computer system toward a remote apparatus; and
   receiving an indication of the comparison at the computer system from the remote apparatus;
   wherein the determining is based on the indication.

9. The method of claim 1 further comprising
   obtaining, at the computer system, second verification-input information associated with each of a second plurality of hardware components of the computer system;
   cryptographically processing the second verification-input information to obtain a second cryptographic result representing a second current hardware configuration of the computer system; and
   determining whether to allow or inhibit further operation of at least one of the plurality of hardware components comprises comparing the cryptographic result to the verification value and the second cryptographic result to a second verification value.

10. A computing device comprising:
   a set of first components; and
   a second component communicatively coupled to the first components, the second component being configured to:
      obtain verification-input information associated with each of the first components, the verification-input information comprising an identifier of each of the first components, the verification-input information comprising at least one of a manufacturer or a model number for at least one of the first components;

cryptographically process the verification-input information by applying a one-way hash function to the verification-input information to obtain a cryptographic result representing a current hardware configuration of the computing device;
compute a verification value by cryptographically applying a verification key stored on the computing device to a signed value stored on the computing device; and
determine whether to allow or inhibit, depending upon a comparison of the cryptographic result with the verification value, further operation of at least one of (1) the second component, or (2) at least one of the first components. the verification value comprising device integrity information comprising an identifier of each of the first components of a predetermined hardware configuration of the computing device, wherein the second component is configured to determine whether to allow or inhibit further operation at least one of periodically or in response to a triggering event.

11. The device of claim 10 wherein the second component is further configured to:
access the verification value from storage on the computing device; and
make the comparison of the cryptographic result with the verification value.

12. The device of claim 11 wherein the second component comprises one-time programmable memory and the second component is configured to access the verification value from the one-time programmable memory.

13. The device of claim 10 wherein to cryptographically process the verification-input information the second component is configured to generate the cryptographic result using the verification-input information and a secret key stored on the device.

14. The device of claim 10 wherein each of the first components is configured to provide the verification-input information associated with that component.

15. The device of claim 10 wherein the second component is further configured to store the cryptographic result on the device in one-time programmable memory.

16. The device of claim 15 wherein the second component is configured to program a field-programmable read only memory a first time that the cryptographic result is determined in order to store the cryptographic result.

17. The device of claim 10 further comprising a transceiver communicatively coupled to the second component, wherein the second component is further configured to:
send the cryptographic result via the transceiver toward a remote system; and
receive an indication from the remote system via the transceiver;
wherein the second component is configured determine whether to allow or inhibit the further operation based on the indication.

18. A computing device comprising:
means for obtaining component information associated with each of a plurality of hardware components of the computing device, the component information comprising an identifier of each of the plurality of hardware components of the computing device, the component information comprising at least one of a manufacturer or a model number for at least one of the plurality of hardware components;
means for cryptographically processing the component information by applying a one-way hash function to the component information to obtain a cryptographic result representing a current hardware configuration of the computing device;
means for computing a verification value by cryptographically applying a verification key stored on the computing device to a signed value stored on the computing device, the verification value comprising device integrity information comprising an identifier of each component of a plurality of components of a predetermined hardware configuration of the computing device, wherein the means for obtaining is configured to obtain the component information at least one of periodically or in response to a triggering event;
means for making a comparison of the cryptographic result with the verification value; and
means for determining whether to allow or inhibit, depending upon the comparison of the cryptographic result with the verification value, further operation of the computing device.

19. The device of claim 18 wherein the means for cryptographically processing includes means for cryptographically combining the component information and a secret key stored on the computing device.

20. The device of claim 18 further comprising one-time programmable memory means for storing the verification value.

21. The device of claim 20 wherein the one-time programmable memory means comprises a field-programmable read only memory.

22. The device of claim 18 further comprising transceiver means, communicatively coupled to the means for cryptographically processing and the means for determining, for:
sending the cryptographic result toward a remote system; and
receiving an indication from the remote system;
wherein the means for determining are configured to determine whether to allow or inhibit the further operation based on the indication.

23. A non-transitory computer-readable medium, of a computing device, comprising computer-readable instructions configured to cause a computer to:
obtain component information associated with each of a plurality of components of the computing device at least one of periodically or in response to a triggering event other than passage of time, the component information comprising an identifier of each of the plurality of components of the computing device, the component information comprising at least one of a manufacturer or a model number for at least one of the plurality of components;
cryptographically process the component information by applying a one-way hash function to the component information to obtain a cryptographic result representing a current hardware configuration of the computing device;
compute a verification value using storage on the computing device by cryptographically combining a signed value stored on the computing device and a verification key openly stored on the computing device, the verification value comprising device integrity information comprising an identifier of each component of a plurality of components of a predetermined hardware configuration of the computing device;
make a comparison of the cryptographic result with the verification value; and determine whether to allow or inhibit, depending upon the comparison of the cryptographic result with the verification value, further operation of the computing device.

24. The computer-readable medium of claim 23 wherein the instructions configured to obtain the verification value are configured to cause the computer to access the verification value from one-time programmable memory of the computing device.

25. The computer-readable medium of claim 23 wherein the instructions configured to cause the computer to cryptographically process the component information are configured to cause the computer to cryptographically combine the component information and a secret key stored on the computing device.

26. The computer-readable medium of claim 23 further comprising instructions configured to cause the computer to store the cryptographic result in one-time programmable memory of the computing device as the verification value a first time that the cryptographic result is obtained.

27. The computer-readable medium of claim 23 further comprising instructions configured to cause the computer to transmit the cryptographic result from the computing device toward a remote apparatus, wherein the instructions configured to cause the computer to determine are configured to cause the computer to determine whether to allow or inhibit the further operation based on an indication received in response to transmission of the cryptographic result.

* * * * *